(12) United States Patent
Park et al.

(10) Patent No.: US 10,961,364 B2
(45) Date of Patent: Mar. 30, 2021

(54) COVER WINDOW FOR PROTECTING DISPLAY PANEL, DISPLAY DEVICE USING SAME, AND COVER WINDOW MANUFACTURING METHOD

(71) Applicant: SAMSUNG ELECTRONICS CO., LTD., Suwon-si (KR)

(72) Inventors: Byung-ha Park, Suwon-si (KR); Nak-hyun Kim, Suwon-si (KR); Yong-suk Cho, Hwaseong-si (KR); Cheol Ham, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 223 days.

(21) Appl. No.: 15/779,677

(22) PCT Filed: Jul. 5, 2016

(86) PCT No.: PCT/KR2016/007253
§ 371 (c)(1),
(2) Date: May 29, 2018

(87) PCT Pub. No.: WO2017/099320
PCT Pub. Date: Jun. 15, 2017

(65) Prior Publication Data
US 2018/0371196 A1    Dec. 27, 2018

(30) Foreign Application Priority Data

Dec. 10, 2015 (KR) .................. 10-2015-0175765

(51) Int. Cl.
| | |
|---|---|
| *C08J 5/18* | (2006.01) |
| *C08J 5/06* | (2006.01) |
| *C08L 33/12* | (2006.01) |
| *C08L 79/08* | (2006.01) |
| *C08K 3/22* | (2006.01) |
| *C08K 3/36* | (2006.01) |
| *B32B 27/08* | (2006.01) |
| *B32B 27/18* | (2006.01) |
| *B32B 27/36* | (2006.01) |
| *B32B 7/12* | (2006.01) |
| *B32B 27/30* | (2006.01) |
| *C08J 7/04* | (2020.01) |
| *G06F 3/041* | (2006.01) |
| *B32B 27/28* | (2006.01) |
| *C09J 5/06* | (2006.01) |
| *C09J 183/04* | (2006.01) |

(52) U.S. Cl.
CPC ............ *C08J 7/0423* (2020.01); *B32B 27/08* (2013.01); *B32B 27/18* (2013.01); *B32B 27/281* (2013.01); *B32B 27/36* (2013.01); *C08J 5/18* (2013.01); *C08K 3/22* (2013.01); *C08K 3/36* (2013.01); *C08L 33/12* (2013.01); *C08L 79/08* (2013.01); *C09J 5/06* (2013.01); *C09J 183/04* (2013.01); *G06F 3/041* (2013.01); *B32B 2255/10* (2013.01); *B32B 2264/102* (2013.01); *B32B 2307/412* (2013.01); *B32B 2457/20* (2013.01); *C08J 2333/12* (2013.01); *C08J 2367/02* (2013.01); *C08J 2379/08* (2013.01); *C08J 2483/04* (2013.01); *C08K 2003/2227* (2013.01); *C08K 2003/2244* (2013.01); *C08K 2201/011* (2013.01); *C09J 2483/00* (2013.01)

(58) Field of Classification Search
None
See application file for complete search history.

(56) References Cited

U.S. PATENT DOCUMENTS

| | | |
|---|---|---|
| 8,673,419 B2 | 3/2014 | Determan et al. |
| 9,178,172 B2 | 11/2015 | Cheon |
| 9,238,758 B2 | 1/2016 | Determan et al. |
| 9,447,285 B2 | 9/2016 | Kang et al. |
| 9,608,216 B2 | 3/2017 | Cheon |
| 9,778,398 B2 | 10/2017 | Kang et al. |
| 2001/0000961 A1* | 5/2001 | Hikida ............... G02F 1/1333 345/173 |
| 2007/0229953 A1 | 10/2007 | Chen et al. |
| 2008/0026182 A1 | 1/2008 | Abe et al. |
| 2011/0012842 A1 | 1/2011 | Lee et al. |
| 2011/0126968 A1 | 6/2011 | Determan et al. |
| 2012/0019915 A1* | 1/2012 | Yan .................... B32B 33/00 359/586 |
| 2014/0147667 A1 | 5/2014 | Determan et al. |
| 2014/0287213 A1 | 9/2014 | Lee et al. |
| 2014/0353613 A1 | 12/2014 | Cheon |

(Continued)

FOREIGN PATENT DOCUMENTS

| | | |
|---|---|---|
| CN | 101790712 A | 7/2010 |
| CN | 104487494 A | 4/2015 |

(Continued)

OTHER PUBLICATIONS

International Search Report dated Oct. 17, 2016 in corresponding International Patent Application No. PCT/KR2016/007253.

(Continued)

*Primary Examiner* — Sheeba Ahmed
(74) *Attorney, Agent, or Firm* — Staas & Halsey LLP

(57) ABSTRACT

Disclosed is a cover window for protecting a display panel. The present cover window comprises: a transparent sheet through which light of the display panel passes, the transparent sheet including nano-inorganic particles; and a coating layer disposed on the transparent sheet.

12 Claims, 14 Drawing Sheets

(56) References Cited

U.S. PATENT DOCUMENTS

| | | |
|---|---|---|
| 2015/0004334 A1 | 1/2015 | Bae et al. |
| 2015/0140279 A1 | 5/2015 | Kang et al. |
| 2015/0346872 A1 | 12/2015 | Hwang et al. |
| 2016/0020417 A1 | 1/2016 | Cheon |
| 2016/0040016 A1 | 2/2016 | Kang et al. |
| 2016/0297178 A1 | 10/2016 | Kang et al. |
| 2018/0004254 A1 | 1/2018 | Park et al. |

FOREIGN PATENT DOCUMENTS

| | | |
|---|---|---|
| CN | 104679309 A | 6/2015 |
| CN | 105045451 A | 11/2015 |
| EP | 2840109 | 2/2015 |
| JP | 2010-111805 | 5/2010 |
| JP | 2014-6448 | 1/2014 |
| KR | 10-2006-0115447 | 11/2006 |
| KR | 10-0911255 | 7/2009 |
| KR | 10-0978521 | 8/2010 |
| KR | 10-2010-0134654 | 12/2010 |
| KR | 20110007895 A † | 1/2011 |
| KR | 10-1030387 | 4/2011 |
| KR | 20120077643 A † | 7/2012 |
| KR | 10-1276610 | 6/2013 |
| KR | 20140027024 A † | 3/2014 |
| KR | 10-2014-0058762 | 5/2014 |
| KR | 10-1397707 | 5/2014 |
| KR | 10-2014-0140742 | 12/2014 |
| KR | 10-1470467 | 12/2014 |
| KR | 10-2015-0058066 | 5/2015 |
| KR | 20150058066 A † | 5/2015 |
| KR | 10-2015-0107320 | 9/2015 |
| KR | 10-2015-0114891 | 10/2015 |
| KR | 10-2016-0079485 | 7/2016 |

OTHER PUBLICATIONS

Written Opinion of the International Searching Authority dated Oct. 17, 2016 in corresponding International Patent Application No. PCT/KR2016/007253.
Extended European Search Report dated Dec. 4, 2018 in European Patent Application No. 16873186.7.
Partial Supplementary European Search Report dated Aug. 29, 2018 in European Patent Application No. 16873186.7.
Non-Patent Literature, Zhu Wu, Polymer Interface and Adhesion, 9.3 Plasma Treatment, pp. 277-279, Dec. 31, 1987, http://book.duxiu.com/bookDetail.jsp?dxNumber=000001036928&d=D92B7BFC669409E17D22412F221561.
Chinese Office Action dated Nov. 3, 2020, in corresponding Chinese Patent Application No. 201680071629.2.
Communication pursuant to Article 94(3) EPC dated Jan. 21, 2021, in corresponding European Patent Application No. 16 873 186.7.
Seon Mook Hwang, "A Study on the Adhesion and Electrical Performance by Plasma Treatment of Semiconductive Silicone Rubber", p. 41, Feb. 2005, Master Degree Dissertation, Department of Electrical Engineering, Graduate School, Inha University, http://thesis.inha.ac.kr/Lib/upload/pdf/2005-02/22031091.pdf.†

\* cited by examiner
† cited by third party

420

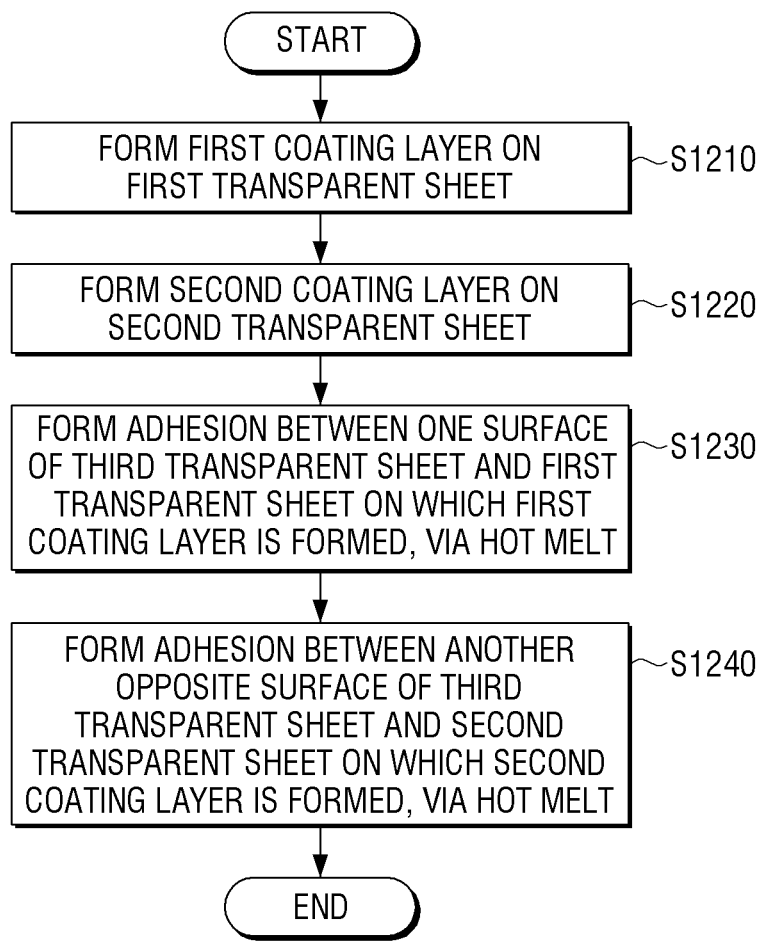

COVER WINDOW FOR PROTECTING DISPLAY PANEL, DISPLAY DEVICE USING SAME, AND COVER WINDOW MANUFACTURING METHOD

CROSS REFERENCE TO RELATED APPLICATIONS

This application is a national phase application under 35 U.S.C. § 371 of PCT international patent application no. PCT/KR2016/007253, filed Jul. 5, 2016 which claims the foreign priority benefit under 35 U.S.C. § 119 to Korean patent application no. 10-2015-0175765 filed Dec. 10, 2015, the contents of which are incorporated herein by reference.

BACKGROUND OF THE INVENTION

Field of the Invention

Apparatuses and methods consistent with the present disclosure relate to a cover window for protecting a display panel, a display device using the same, and a method of manufacturing the cover window, and more particularly, to a cover window for protecting a display panel with enhanced durability by changing the composition and structure of the cover window, a display using the same, and a method of manufacturing the cover window.

Description of the Related Art

A display device displays visual and stereoscopic image information and is, for example, a liquid crystal display device (LCD), an electro-luminescence display device (ELD), a field emission display device (FED), a plasma display panel (PDP), a thin film transistor liquid crystal display (TFT-LCD), or the like. These display devices have been used in various electronic devices such as a television, a computer monitor, a notebook computer, a portable terminal, a display of a refrigerator, and a display of a camera. These display devices interface with a user using various input devices such as a keyboard, a mouse, a digitizer, and a touch panel.

Thereamong, a touch panel is a device that is installed on a display surface of a display panel to form a touchable display device (referred to as a touchscreen) and enables a user to select desired information while viewing an image and it is convenient that the touch panel is simply handled, barely malfunctions, enables input without a separate input device, and is also rapidly and easily handled through information displayed on a screen by the user. Recently, a foldable display device to which the tendency of soft electronics is applied has attracted much attention. In particular, demands for a foldable display device having both flexibility (flexuosity) and durability are on increase. In general, a display device includes a display panel for displaying an image and a touch panel disposed on the display pane and is configured by forming adhesion of a cover window on the touch panel via an optically clear adhesive (OCA).

Electronic products employing the display have become gradually lightweight, thinned, and flexible and, accordingly, a significant amount of research has been conducted into a film type cover window with high hardness, high rigidity, and flexibility. As a display panel with a film cover window that adheres thereto has been used in a flexible device, the display panel has satisfied flexibility but has degraded rigidity compared with a window formed of a plate-shaped glass and plastic material and, accordingly, there is a problem in that errors occur in terms of an outer appearance, for example, the display panel is scratched and squashed. In addition, to replace expensive tempered glass, many plastic window materials have been introduced but a product that satisfies both flexural property and impact resistance has not been introduced yet.

SUMMARY OF THE INVENTION

The present disclosure provides a cover window for protecting a display panel with enhanced durability by changing the composition and structure of the cover window, a display using the same, and a method of manufacturing the cover window.

According to an aspect of the present disclosure, a cover window for protecting a display panel includes a transparent sheet configured to transmit light of the display panel and including a nano inorganic particle, and a coating layer disposed on the transparent sheet.

The nano inorganic particle may include at least one of $SiO_2$, $Al_2O_3$, and $ZrO_2$.

The nano inorganic particle may be included in the transparent sheet by 10 wt % to 40 wt % with respect to the transparent sheet.

The transparent sheet may have a thickness of 50 µm to 190 µm.

The transparent sheet may include at least one of polyethylene terephthalate (PET), polyethylene naphthalate (PEN), polymethylmethacrylate (PMMA), and colorless polyimide (CPI) as a mother material.

The transparent sheet and the coating layer may adhere to each other using hot melt or polydimethylsiloxane (PDMS).

According to another aspect of the present disclosure, a cover window for protecting a display panel includes a transparent sheet configured to transmit light of the display panel, and a coating layer disposed on the transparent sheet and including a nano inorganic particle.

The nano inorganic particle may include at least one of $Al_2O_3$ and $ZrO_2$.

The coating layer may have a thickness of 10 µm to 80 µm.

The nano inorganic particle may be included in the coating layer by 40 wt % to 60 wt % with respect to the transparent sheet.

The transparent sheet and the coating layer may adhere to each other using hot melt or PDMS.

According to another aspect of the present disclosure, a cover window for protecting a display panel includes a lower transparent sheet configured to transmit light of the display panel, a hot melt cohesive layer disposed on the lower transparent sheet, an upper transparent sheet disposed on the hot melt cohesive layer, and an upper coating layer disposed on the upper transparent sheet.

The cover window may further include a lower coating layer disposed between the display panel and the lower transparent sheet.

According to another aspect of the present disclosure, a cover window for protecting a display panel includes a first transparent sheet configured to transmit light of the display panel, a first polydimethylsiloxane (PDMS) cohesive layer disposed on the first transparent sheet and having a plasma-processed surface, a second transparent sheet disposed on the PDMS cohesive layer having a plasma-processed surface, and a coating layer disposed on the second transparent sheet.

The cover window may further include a third transparent sheet disposed on the PDMS cohesive layer having a plasma-processed surface, and a second PDMS cohesive layer disposed on the third transparent sheet and having a plasma-processed surface.

According to an aspect of the present disclosure, a display device includes a display panel configured to display an image, a touch panel disposed on the display panel and configured to recognize user input, and the cover window of any one of claims 1 to 13 disposed on the touch panel.

According to an aspect of the present disclosure, a method of manufacturing a cover window for protecting a display panel includes preparing an upper transparent sheet including a nano inorganic particle and forming a coating layer on the upper transparent sheet.

The coating layer may include a nano inorganic particle and the forming of the coating layer may include mixing an organic binder and an inorganic binder to form a coating solution, coating the mixed coating solution on the upper transparent sheet, and curing the coated coating solution with ultraviolet rays.

The coating of the mixed coating solution may be any one of a dipping method, a spray method, a slot die method, and a gravia method.

The method may further include preparing a lower transparent sheet and forming adhesion between a lower portion of the upper transparent sheet on which the coating layer is formed and an upper portion of the lower transparent sheet, wherein the forming of adhesion may uses a hot melt method.

The method may further include plasma processing opposite surfaces of PDMS, preparing a lower transparent sheet, and forming adhesion between a lower portion of the upper transparent sheet on which the coating layer is formed and an upper portion of the lower transparent sheet, wherein the forming of adhesion may use the PDMS having plasma-processed opposite surface and disposed between the transparent sheet and the lower transparent sheet.

BRIEF DESCRIPTION OF THE DRAWING FIGURES

FIGS. 9 and 11 to 14 are flowcharts for explanation of a method of manufacturing a cover window according to various exemplary embodiments of the present disclosure.

DETAILED DESCRIPTION OF THE EXEMPLARY EMBODIMENTS

Figure 1A:
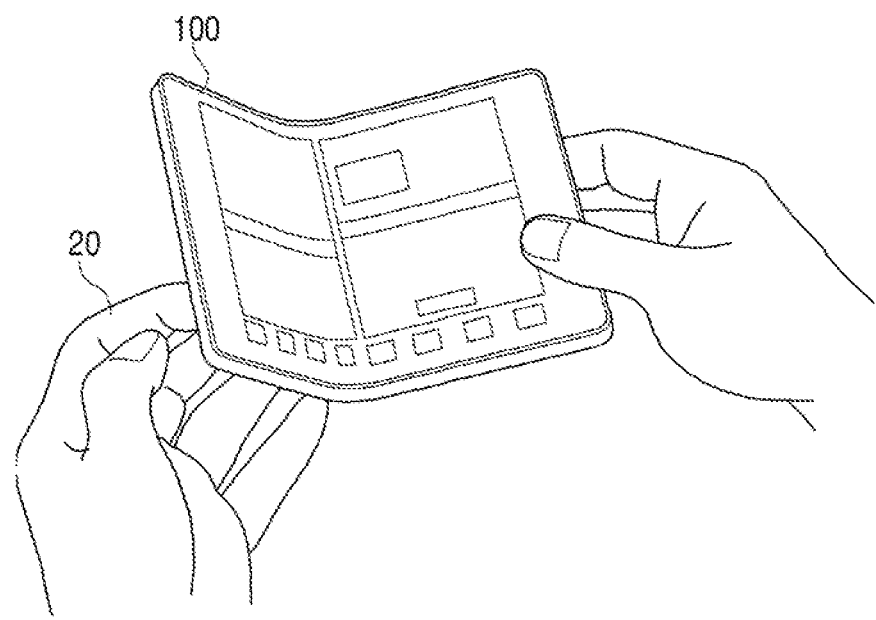
FIGS. 1A and 1B are diagrams showing an example of a display device using a cover window according to an exemplary embodiment of the present disclosure.

Hereinafter, the present disclosure will be described in detail by explaining exemplary embodiments of the present disclosure with reference to the attached drawings. In the description of the present disclosure, certain detailed explanations of related art are omitted when it is deemed that they may unnecessarily obscure the essence of the present disclosure. The present disclosure may, however, be embodied in many different forms and should not be construed as limited to the exemplary embodiments set forth herein. Rather, these embodiments are provided so that this disclosure will be thorough and complete, and will fully convey the scope of the present disclosure to those of ordinary skill in the art.

When a certain part "includes" a certain component, this indicates that the part may further include another component instead of excluding another component unless there is no different disclosure. In addition, various components and regions in the drawings may be schematically illustrated. Accordingly, the technical spirit of the present disclosure is not limited by relative sizes or distances illustrated in the drawings.

FIG. 1 is a diagram showing an example of a display device using a cover window according to an exemplary embodiment of the present disclosure.

Figure 1B:
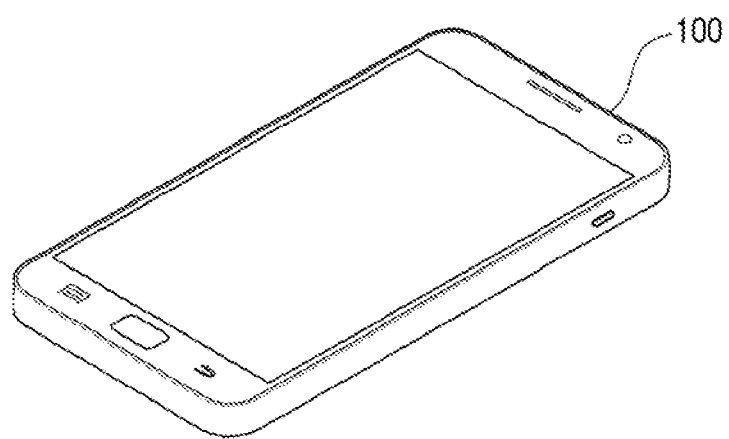

Referring to FIG. 1A, a display device 100 using the cover window according to an exemplary embodiment of the present disclosure may be a foldable display device. The display device 100 may receive a command via a touch of a finger 20 of a user. Although FIG. 1 illustrates only a touch of a user finger, input of various input sources such as a stylus pen may be detected in reality. Although FIG. 1 and a description illustrates and describes only the case in which the cover window according to an exemplary embodiment of the present disclosure is used in a foldable display that is foldable like a book, the cover window may be used in all of a step bendable display, a flexible display to be used in rolls, and a nonflexible flat display shown in FIG. 1B in reality. Although FIG. 1 illustrates the case in which the display device 100 includes one display, the display device 100 may include a plurality of displays. The display device 100 according to an exemplary embodiment of the present disclosure may be a smartphone but this is merely an example and, thus, the display device 100 may be embodied in various display devices such as a step bendable smartphone, a desk top personal computer (PC), a tablet PC, and a smart television (TV).

Figure 2:
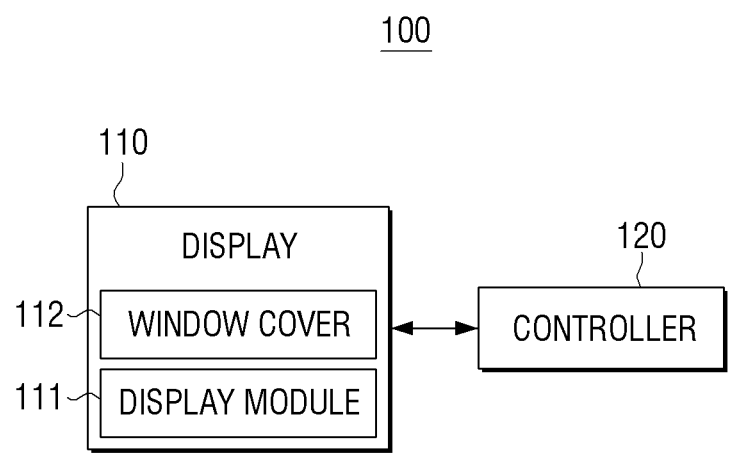
FIG. 2 is a block diagram showing a detailed configuration of the display device of FIG. 1.

FIG. 2 is a block diagram showing a detailed configuration of the display device of FIG. 1.

Referring to FIG. 2, the display device 100 may include a display 110 and a controller 120. In detail, the display 110 may include a display module 111 and a cover window 112. Although omitted for convenience of description, various components such as a storage, a communicator, and an audio outputter are included in a display device in reality.

In detail, although not shown, the display module 111 may include a display panel, a touch panel, and so on. Although not shown, the cover window 112 may include at least one transparent sheet and at least one coating layer to protect a display panel and a touch panel. A detailed configuration of the display module 111 and the cover window 112 is described below in detail with reference to FIGS. 3 to 6.

The controller 120 may control the display 110 to display content, etc. by a display panel included in the display module 111 of the display 110 or to display a monitor operation corresponding to a touch detected by the touch panel.

Hereinafter, the cover window 112 included in the display 110 of the display device 100 according to various exemplary embodiments of the present disclosure is described.

Figure 3:
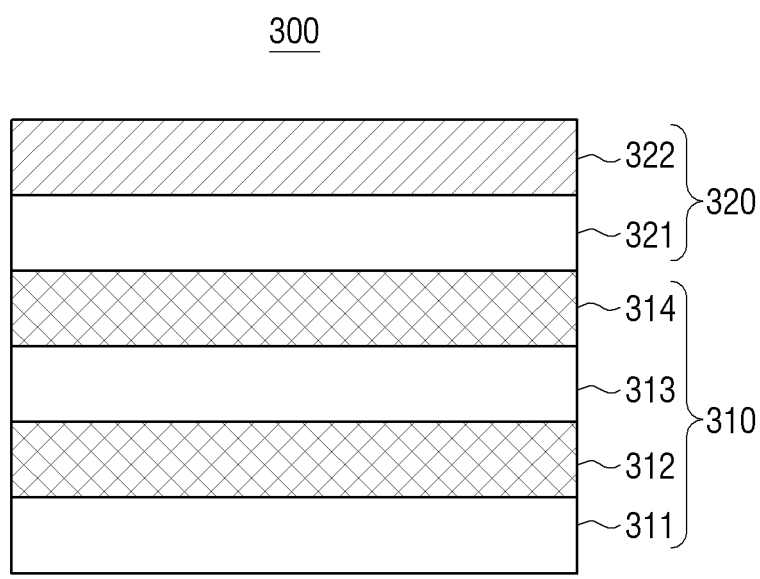
FIG. 3 is a diagram showing the display of FIG. 2 in detail.

FIG. 3 is a diagram showing the display of FIG. 2 in detail.

Referring to FIG. 3, a display 300 may include a display module 310 and a cover window 320. In this case, the display module 310 may include a display panel 311, a lower cohesive layer 312, a touch panel 313, and an upper cohesive layer 314.

In this case, the display panel 311 may display multimedia content, an image, a video image, a text, etc. according to control of the controller 120. In this case, the display panel 311 may be configured with any one of a liquid crystal display (LCD) panel, a plasma display panel (PDP), an organic light emitting diode (OLED), a vacuum fluorescent display (VFD), a field emission display (FED), and an electro luminescence display (ELD).

The touch panel 313 may be an input device for recognizing a contact position and transmitting the recognizing information to a system when a user presses a monitor using a finger, a pen, or the like. In detail, the touch panel 313 may use a method in which one side of a transparent film is coated with indium tin oxide (ITO) having a pattern electrode formed thereon to enable predetermined amplitude of current to flow in the ITO and a minute capacitance change generated when a fingers touches a display surface is detected to calculate a touch position. In addition, the touch panel 313 may use a resistive method, a surface acoustic wave (SAW) method, an infrared ray method, or an optical method.

The lower cohesive layer 312 may have the display panel 311 and the touch panel 313 that adheres thereto. In this case, the lower cohesive layer 312 may be an optically clear adhesive (OCA) film. The OCA film may be an optical transparent installation film and may be used for adhesion of an optical film, acryl, PC, glass, and so on. Even if the OCA film is coupled to a counterpart component, the OCA film may maintain high transmittance and, thus, may be used for adhesion between a touch panel of an electronic device such as a portable phone and a display panel of an LCD, an OLED, or the like to transmit an electrical signal there between.

The lower cohesive layer 312 may be a hot melt cohesive agent. The hot melt cohesive agent may be adhesives that never use water or an organic solvent and includes, as a main component, thermoplastic resin that is in a liquid state at high temperature and in a solid state at room temperature. The hot melt cohesive agent may be a heat melting type cohesive agent that is heated and melted and coated and compressed in a liquid state onto an adhesion target at high temperature and, then, is cooled and hardened to achieve adhesive strength within several seconds and to complete adhesion. In this case, the hot melt cohesive agent may be at least one of polyurethane (PU), thermoplastic polyurethane (TPU), polyether sulfone (PES), polyamide (PA), and ethylene-vinyl acetate copolymer (EVA).

The lower cohesive layer 312 may be polydimethylsiloxane (PDMS) having a plasma-processed surface. PDMS is an elastomer that is transparent up to a predetermined thickness to be used to manufacture an optical device and has very high durability. In addition, PDMS barely adheres to another polymer due to low surface energy but a surface of PDMS is easily deformed by plasma and, accordingly, PDMS has increased surface energy to be used as a cohesive agent. In detail, after a surface of PDMS is $O_2$-plasma processed and a surface of an adhesion target is $N_2$-plasma processed, the PDMS and the adhesion target may be used.

The upper cohesive layer 314 may be used for adhesion between the touch panel 313 and the cover window 320. In this case, the upper cohesive layer 314 may be any one of an OCA film, a hot melt cohesive agent, and PDMS having a plasma-processed surface in the same way as the lower cohesive layer 312.

In this case, the upper cohesive layer 314 and the lower cohesive layer 312 may use a hot melt adhesive or PDMS having a plasma-processed surface instead of using an OCA film and, accordingly, the cover window 320 with high rigidity and enhanced flexural property and impact resistance may be manufactured.

Although the case in which the display module 310 includes a touch panel that is recognizable user manipulation is illustrated for convenience of description of the present disclosure, the display module 310 may include only a general display panel without a touch input function in reality.

The cover window 320 may be disposed on the display module 310, that is, on an outermost part of a display to protect a display panel and a touch panel. In detail, the cover window 320 may include a transparent sheet 321 that transmits light of a display panel therethrough and a coating layer 322 disposed on the transparent sheet 321.

In this case, the transparent sheet 321 that is disposed on the display module 310 and transmits light of the display panel therethrough may be a plastic film. In detail, the transparent sheet 321 may be formed of at least one of polyethylene terephthalate (PET), polyethylene naphthalate (PEN), polymethylmethacrylate (PMMA), and colorless polyimide (CPI). In this case, the transparent sheet 321 may have a thickness of 50 μm to 190 μm. In detail, the transparent sheet 321 may have a thickness of 50 μm to 100 μm. A plastic film may be used to manufacture the cover window 320 for protection of a display panel and, thus, a flexible display or a foldable display that has flexibility and does not break after being bent a plurality of times may be manufactured.

In this case, the transparent sheet 321 may further include a nano inorganic particle with at least one of PET, PEN, PMMA, and CPI as a mother material. In this case, the nano inorganic particle may be included by 10 wt % to 40 wt % with respect to the transparent sheet 321. In this case, the nano inorganic particle included in the transparent sheet 321 may be at least one of $SiO_2$, $Al_2O_3$, and $ZrO_2$. As such, the transparent sheet 321 further includes a nano inorganic particle and, thus, hardness may be enhanced and, thus, a cover window that is as thin as possible and is not squashed due to maintained rigidity may be manufactured.

The coating layer 322 disposed on the transparent sheet 321 may protect the transparent sheet 321 that is vulnerable to scratch and has degraded chemical resistance. In this case, the coating layer 322 may be formed of a silica organic-inorganic complex composition. For example, the coating layer 322 may be mixed with an inorganic binder as a $SiO_2$ particle having a surface reformed with acryl and an organic binder as an acryl binder. In this case, the $SiO_2$ particle may have a size of 20 nm. The coating layer 322 disposed on the transparent sheet 321 may have a thickness of 10 μm to 80 μm. In detail, the coating layer 322 may have a thickness of 10 μm to 50 μm. As such, the coating layer 322 may be disposed on the transparent sheet 321, thereby overcoming errors in terms of an outer appearance, for example, a display is scratched and squashed.

The coating layer 322 may further include a nano inorganic particle. In this case, the nano inorganic particle may be included by 40 wt % to 60 wt % with respect to the coating layer 322. In this case, the nano inorganic particle included in the coating layer 322 may be at least one of $Al_2O_3$ and $ZrO_2$. In detail, the nano inorganic particle included in the coating layer 322 may be $Al_2O_3$. As such, the coating layer 322 further includes a nano inorganic particle to enhance hardness and, thus, a cover window that is as thin as possible and is not squashed due to maintained rigidity may be manufactured.

In particular, in the case of a foldable display, it may be important to adjust a thickness of a cover window of a display to achieve bending force and rigidity of the display. Hereinafter, a thickness of the transparent sheet 321 and the coating layer 322 is described in detail with reference to FIGS. 4 and 5.

Figure 4:
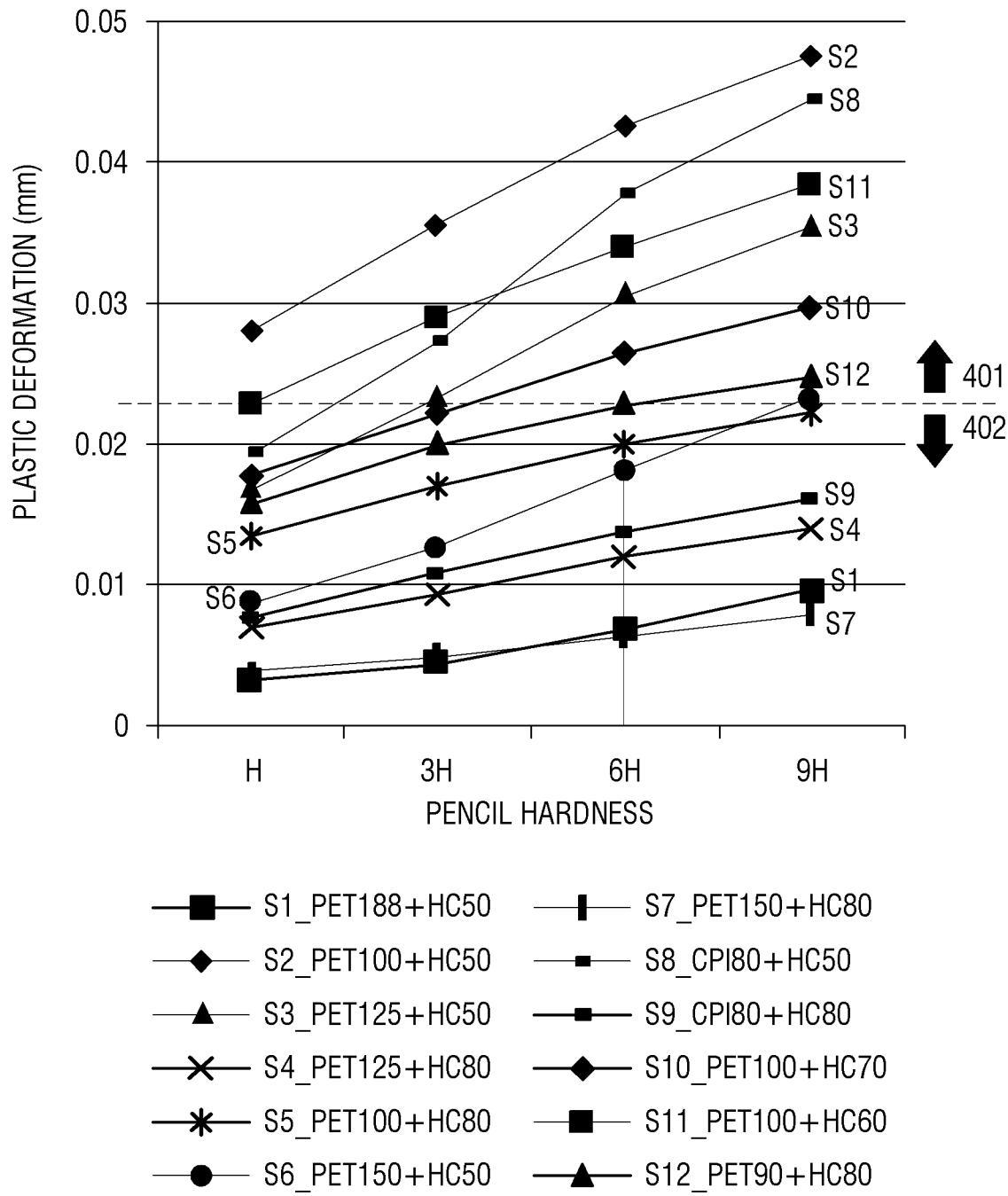
FIGS. 4 and 5 are graphs showing hardness and bending load depending on various cover windows.

FIG. 4 is a graph showing hardness of various types of cover windows. In detail, FIG. 4 is a graph showing a plastic deformation degree when a pencil hardness experiment is performed on various types of cover windows. For example, when a plastic deformation degree is high, this means that hardness is low and, when the plastic deformation degree is low, this means that hardness is high.

Referring to FIG. 4, a deformation degree of a cover window via the pencil hardness experiment may be divided into a region 401 with a high deformation degree and a region 402 with an acceptable deformation degree. This may be arbitrarily determined and a reference thereof may be changed in reality. It may be seen that a cover window S2 including 100 μm of a transparent sheet (PET) and 50 μm of a coating layer (HC) pertains in the region 401 with a high deformation degree even in the case of low pencil hardness of 1 H. It may be seen that a cover window S1 including 188 μm of a transparent sheet and 50 μm of a coating layer (HC) is barely plastic-deformed even in the case of high pencil hardness of 9 H. In addition, it may be seen that a cover window S5 including 100 μm of a transparent sheet and 80 μm of a coating layer (HC) is slightly deformed even in the case of high pencil hardness of 9 H but pertains in the region 402 with an acceptable deformation degree.

Figure 5:
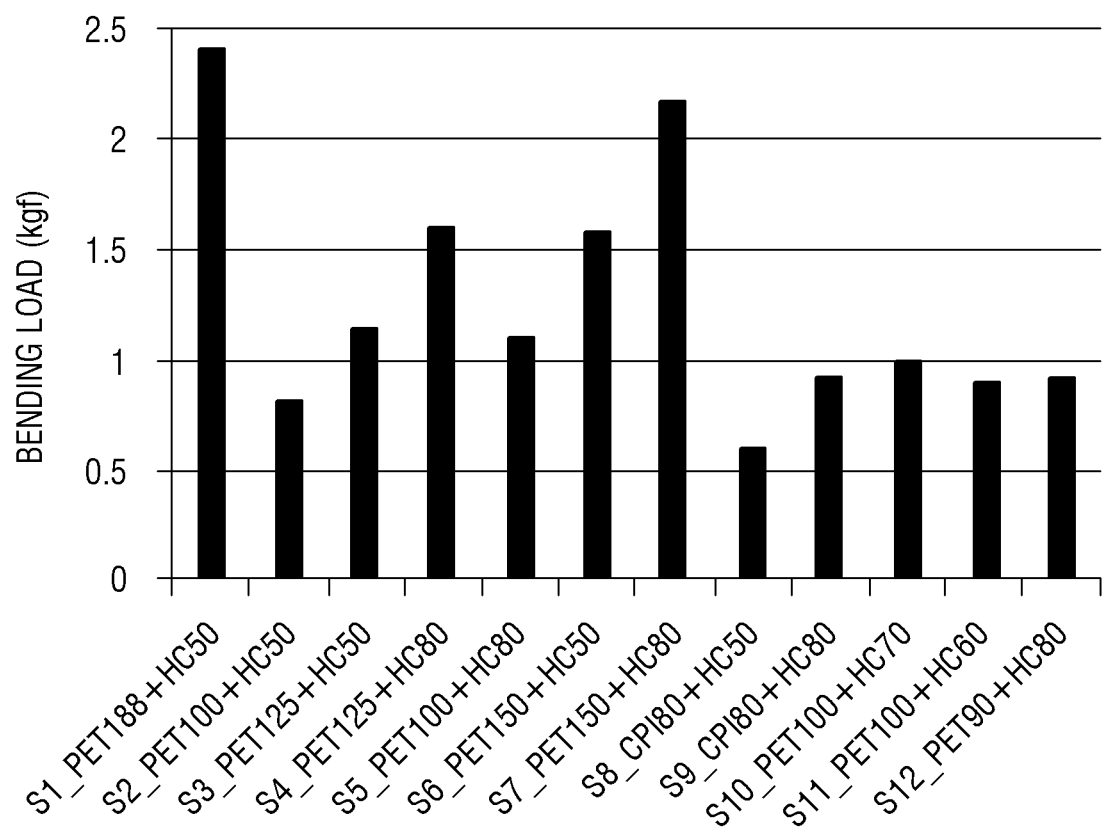

FIG. 5 is a graph showing bending load of various types of cover windows. In this case, bending load may refer to force required to bend a display.

As seen from FIG. 5, the cover window S1 including 188 μm of a transparent sheet and 50 μm of a coating layer (HC) requires very high bending load and, thus, much force is required to bend a display and, the cover window S2 including 100 μm of a transparent sheet (PET) and 50 μm of a coating layer (HC) has low bending load and, thus, the display is easily bent. It may be seen that the cover window S5 including 100 μm of a transparent sheet and 80 μm of a coating layer (HC) is not easily plastic-deformed and relatively low bending load even in the case of high pencil hardness as shown in FIG. 4 and has relatively low bending load.

Hardness and bending load of a cover window depending on a type and thickness thereof are described below in detail with reference to Table 1 shown in detailed numerals.

TABLE 1

Modulus Hardness and Bending Load for each Cover Window Type

| | | Cover Window | | | |
|---|---|---|---|---|---|
| | | PET100/HC50 | PET100/HC80 | PET188/HC50 | PET180/HC50 |
| Modulus Hardness (H) | | Squashed | 9 | 9 | 2 |
| Bending Load | R5 | 8 | 7 | 18 | 4 |
| (N) | R3 | 15 | 18 | 40 | 11 |

Referring to Table 1 above, when a cover window including 100 μm of a transparent sheet (PET) and 50 μm of a coating layer (HC) has a small total thickness of 150 μm, bending load is relatively low, that is, 8N for R5 (when a radius of a folded part of a display is 5 mm) and 15N for R3 (when a radius of a folded part of a display is 3 mm) and, thus, although the display is easily bent, Modulus hardness is low and, thus, the display is squashed when a pencil hardness experiment of pressing the display with a pencil lead is performed In this case, Modulus hardness refers to an elasticity coefficient indicating a ratio of stress and deformation and, as Modulus hardness increases, a material is not easily deformed.

To ensure rigidity of a predetermined level or more, when a thickness of a transparent sheet (PET) is increased to configure a cover window including 188 μm of a transparent sheet and 50 μm of a coating layer (HC) and the cover window has a large total thickness of 238 μm, Modulus hardness is slightly high, that is, 9 H and, thus, even if the display is not squashed, bending load is 18N for R5 and 40N for R3 and, thus, it may be seen that high force is required to bend the display.

When CPI is used as a transparent sheet, it may be seen that a display is easily bent due to high flexibility but is easily squashed due to low Modulus hardness.

Accordingly, it may be seen that, as a thickness of a cover window including a transparent sheet and a coating layer increases, Modulus hardness is increased and thus, the display is not squashed but high force is required to bend the display. Accordingly, it may be seen that it is important to ensure rigidity of a predetermined level or more as a thickness of a cover window appropriate for a foldable display is increased by a minimum degree.

To this end, a thickness of a coating layer is increased to configure a cover window including 100 μm of a transparent sheet and 80 μm of a coating layer and the cover window has a total thickness of 180 μm and, in this case, the thickness of the cover window is less than a cover window with an increased thickness of 238 μm but has the same Modulus hardness, i.e., 9 H and bending load is 7N for R5 and 18N for R3 and, thus, it may be seen that very low force is required to bend the display. Accordingly, it may be most appropriate that the cover window 320 of a foldable display 300 includes the transparent sheet 321 of about 100 μm and the coating layer 322 of about 80 μm.

To increase rigidity of the cover window 320, at least one of the transparent sheet 321 and the coating layer 322 may include a nano inorganic particle. Accordingly, a cover window that is maintained with rigidity of a predetermined level or more while having a reduced thickness may be achieved. That is, the cover window 320 that includes the transparent sheet 321 of 100 μm or less and the coating layer 322 of about 80 μm or less and has low bending load without being squashed may be achieved.

Hereinafter, a structure and manufacture method of a cover window for protecting a display panel according to various exemplary embodiments of the present disclosure are described in detail.

Figure 6:
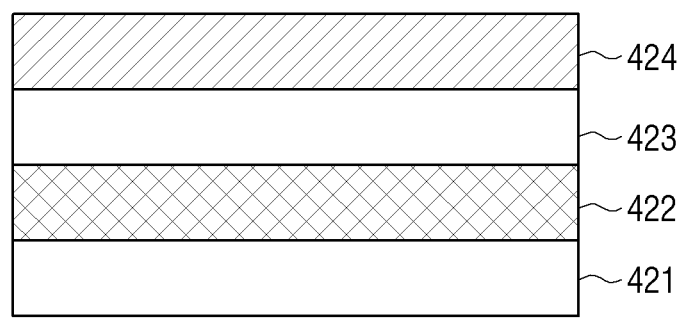
FIGS. 6 to 8 are diagrams showing a cover window according to various exemplary embodiments of the present disclosure.
Figure 7:
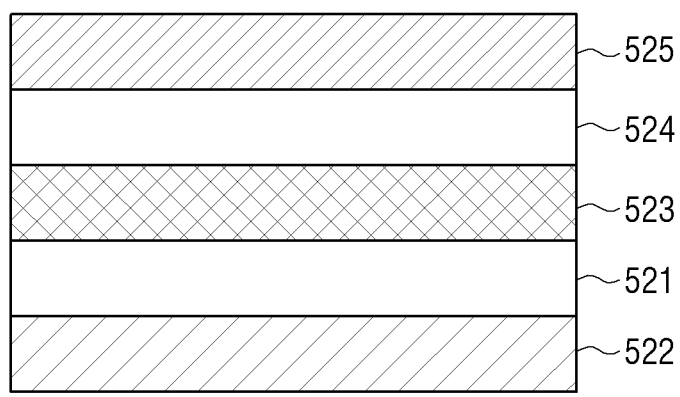
Figure 8:
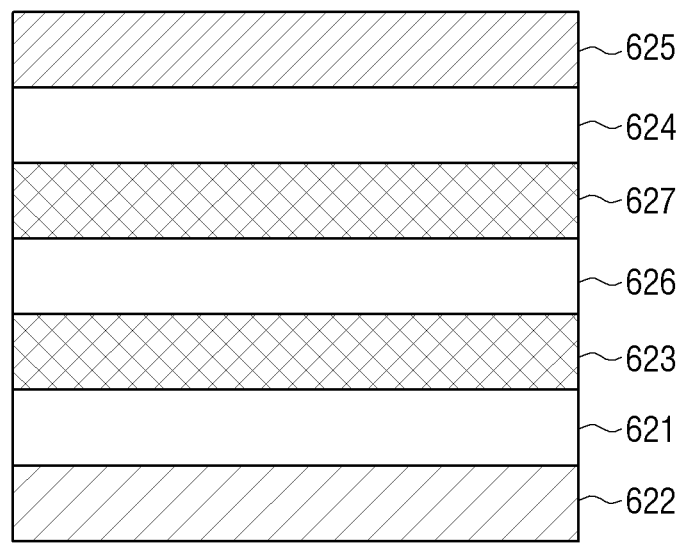

FIGS. 6 to 8 are diagrams showing a cover window according to various exemplary embodiments of the present disclosure.

Referring to FIG. 6, a cover window 420 for protecting a display panel according to an exemplary embodiment of the present disclosure may include a lower transparent sheet 421 that transmits light of a display panel therethrough, a cohesive layer 422 disposed on the lower transparent sheet 421, an upper transparent sheet 423 formed on the cohesive layer 422, and a coating layer 424 formed on the upper transparent sheet 423.

In this case, the lower transparent sheet 421 and the upper transparent sheet 423 may be at least one of PET, PEN, PMMA, and CPI. In this case, the lower transparent sheet 421 and the upper transparent sheet 423 may each have a thickness of 50 µm to 250 µm. In detail, the lower transparent sheet 421 and the upper transparent sheet 423 may each have a thickness of 50 µm to 188 µm.

In this case, the lower transparent sheet 421 and the upper transparent sheet 423 may further include a nano inorganic particle with at least one of PET, PEN, PMMA, and CPI as a mother material. In this case, the nano inorganic particle may be included by 10 wt % to 40 wt % with respect to the transparent sheets 421 and 423. In this case, the nano inorganic particle included in the transparent sheets 421 and 423 may be at least one of $SiO_2$, $Al_2O_3$, and $ZrO_2$. As such, the transparent sheets 421 and 423 further includes a nano inorganic particle and, thus, hardness may be enhanced and, thus, a cover window that is as thin as possible and is not squashed due to maintained rigidity may be manufactured.

The cohesive layer 422 may be used for adhesion between the lower transparent sheet 421 and the upper transparent sheet 423 on which the coating layer 424 is formed. In this case, the cohesive layer 422 may be any one of an OCA film, a hot melt cohesive agent, and PDMS having a plasma-processed surface.

In this case, the cohesive layer 422 may use a hot melt adhesive or PDMS having a plasma-processed surface instead of using an OCA film and, accordingly, the cohesive layer 422 with high rigidity and enhanced flexural property and impact resistance may be manufactured.

The coating layer 424 may be formed on the upper transparent sheet to protect the lower transparent sheet 421, the cohesive layer 422, and the upper transparent sheet 423 that are vulnerable to scratch and has degraded chemical resistance. In this case, the coating layer 424 may be formed of a silica organic-inorganic complex composition. For example, the coating layer 424 may be mixed with an inorganic binder as a $SiO_2$ particle having a surface reformed with acryl and an organic binder as an acryl binder. In this case, the $SiO_2$ particle may have a size of 20 nm. In this case, the coating layer 424 may have a thickness of 10 µm to 80 µm. In detail, the coating layer 424 may have a thickness of 10 µm to 50 µm. As such, the coating layer 424 may be disposed on the upper transparent sheet 423, thereby overcoming errors in terms of an outer appearance, for example, a display is scratched and squashed.

The coating layer 424 may further include a nano inorganic particle. In this case, the nano inorganic particle may be included by 40 wt % to 60 wt % with respect to the coating layer 424. In this case, the nano inorganic particle included in the coating layer 424 may be at least one of $Al_2O_3$ and $ZrO_2$. In detail, the nano inorganic particle included in the coating layer 424 may be $Al_2O_3$. As such, the coating layer 424 further includes a nano inorganic particle to enhance hardness and, thus, a cover window that is as thin as possible and is not squashed due to maintained rigidity may be manufactured.

The cover window 420 according to an exemplary embodiment of the present disclosure may be disposed on a display module (not shown), that is, on an outermost part of a display to protect a display panel and a touch panel. In this case, the cover window 420 may adhere to a display module (not shown) using any one of an OCA film, a hot melt cohesive agent, and PDMS having a plasma-processed surface.

Referring to FIG. 7, a cover window 520 for protecting a display panel according to an exemplary embodiment of the present disclosure may include a lower transparent sheet 521 that transmits light of a display panel therethrough, a lower coating layer 522 disposed below the lower transparent sheet 521, a cohesive layer 523 disposed on the lower transparent sheet 521, an upper transparent sheet 524 formed on the cohesive layer 523, and an upper coating layer 525 formed on the upper transparent sheet 524.

In this case, the lower transparent sheet 521 and the upper transparent sheet 524 may be at least one of PET, PEN, PMMA, and CPI. In this case, the lower transparent sheet 521 and the upper transparent sheet 524 may each have a thickness of 50 µm to 250 µm. In detail, the lower transparent sheet 521 and the upper transparent sheet 524 may each have a thickness of 50 µm to 188 µm.

In this case, the lower transparent sheet 521 and the upper transparent sheet 524 may further include a nano inorganic particle with at least one of PET, PEN, PMMA, and CPI as a mother material. In this case, the nano inorganic particle may be included by 10 wt % to 40 wt % with respect to the transparent sheets 521 and 524. In this case, the nano inorganic particle included in the transparent sheets 521 and 524 may be at least one of $SiO_2$, $Al_2O_3$, and $ZrO_2$. As such, the transparent sheets 521 and 524 further include a nano inorganic particle and, thus, hardness may be enhanced and, thus, a cover window that is as thin as possible and is not squashed due to maintained rigidity may be manufactured.

The lower coating layer 522 may be formed between a lower transparent sheet and a display module (not shown) including a touch panel to balance a structure of the cover window 520 and to reinforce the rigidity of the cover window 520.

In this case, the lower coating layer 522 may be formed of a silica organic-inorganic complex composition. For example, the lower coating layer 522 may be mixed with an inorganic binder as a $SiO_2$ particle having a surface reformed with acryl and an organic binder as an acryl binder. In this case, the $SiO_2$ particle may have a size of 20 nm. As such, the lower coating layer 522 is disposed between the lower transparent sheet 521 and a display module (not shown) including a touch panel to balance a structure of the cover window 520 and to reinforce the rigidity of the cover window 520.

The cohesive layer 523 may be used for adhesion between the lower transparent sheet 521 on which the lower coating layer 522 is formed and the upper transparent sheet 524 on which the upper coating layer 525 is formed. In this case, the cohesive layer 523 may be any one of an OCA film, a hot melt cohesive agent, and PDMS having a plasma-processed surface.

In this case, the cohesive layer 523 may use a hot melt adhesive or PDMS having a plasma-processed surface instead of using an OCA film and, accordingly, the cover window 520 with high rigidity and enhanced flexural property and impact resistance may be manufactured.

The upper coating layer 525 may be formed on the upper transparent sheet 524 to protect the lower transparent sheet 521, the cohesive layer 523, and the upper transparent sheet 524 that are vulnerable to scratch and has degraded chemical resistance. In this case, the upper coating layer 525 may be formed of a silica organic-inorganic complex composition. For example, the upper coating layer 525 may be mixed with an inorganic binder as a $SiO_2$ particle having a surface reformed with acryl and an organic binder as an acryl binder. In this case, the $SiO_2$ particle may have a size of 20 nm. As such, the upper coating layer 525 may be disposed on the upper transparent sheet 524, thereby overcoming errors in terms of an outer appearance, for example, a display is scratched and squashed.

In this case, the lower coating layer 522 and the upper coating layer 525 may have a thickness of 10 μm to 80 μm. In detail, the lower coating layer 522 and the upper coating layer 525 may have a thickness of 10 μm to 50 μm.

The lower coating layer 522 and the upper coating layer 525 may further include a nano inorganic particle. In this case, the nano inorganic particle may be included by 40 wt % to 60 wt % with respect to the lower coating layer 522 and the upper coating layer 525. In this case, the nano inorganic particle included in the lower coating layer 522 and the upper coating layer 525 may be at least one of $Al_2O_3$ and $ZrO_2$. In detail, the nano inorganic particle included in the lower coating layer 522 and the upper coating layer 525 may be $Al_2O_3$. As such, the lower coating layer 522 and the upper coating layer 525 further include a nano inorganic particle to enhance hardness and, thus, a cover window that is as thin as possible and is not squashed due to maintained rigidity may be manufactured.

In this case, the cover window 520 according to an exemplary embodiment of the present disclosure may be disposed on a display module (not shown), that is, on an outermost part of a display to protect a display panel and a touch panel. In this case, the cover window 520 may adhere to a display module (not shown) using any one of an OCA film, a hot melt cohesive agent, and PDMS having a plasma-processed surface.

Referring to FIG. 8, a cover window 620 for protecting a display panel according to an exemplary embodiment of the present disclosure may include a first transparent sheet 621 that transmits light of a display panel therethrough, a first coating layer 622 disposed below the first transparent sheet 621, a first cohesive layer 623 disposed on the first transparent sheet 621, a second transparent sheet 624 that transmits light of a display panel therethrough, a second coating layer 625 disposed on the second transparent sheet 624, a third transparent sheet 626 formed on the first cohesive layer 623, and a second conhesive layer 627 formed on the third transparent sheet 626.

In this case, the first transparent sheet 621, the second transparent sheet 624, and the third transparent sheet 626 may be at least one of PET, PEN, PMMA, and CPI. In this case, the first transparent sheet 621, the second transparent sheet 624, and the third transparent sheet 626 may have a thickness of 50 μm to 250 μm. In detail, the transparent sheet 321, the lower transparent sheet 421, and the upper transparent sheet 423 may have a thickness of 50 μm to 188 μm.

In this case, the first transparent sheet 621, the second transparent sheet 624, and the third transparent sheet 626 may further include a nano inorganic particle with at least one of PET, PEN, PMMA, and CPI as a mother material. In this case, the nano inorganic particle may be included by 10 wt % to 40 wt % with respect to the transparent sheets 621, 624, and 626. In this case, the nano inorganic particle included in the transparent sheets 621, 624, and 626 may be at least one of $SiO_2$, $Al_2O_3$, and $ZrO_2$. As such, the transparent sheets 621, 624, and 626 further include a nano inorganic particle and, thus, hardness may be enhanced and, thus, a cover window that is as thin as possible and is not squashed due to maintained rigidity may be manufactured.

The first coating layer 622 may be formed between the first transparent sheet 621 and a display module (not shown) including a touch panel to balance a structure of the cover window 620 and to reinforce the rigidity of the cover window 620.

In this case, the first coating layer 622 may be formed of a silica organic-inorganic complex composition. For example, the first coating layer 622 may be mixed with an inorganic binder as a $SiO_2$ particle having a surface reformed with acryl and an organic binder as an acryl binder. In this case, the $SiO_2$ particle may have a size of 20 nm. As such, the first coating layer 622 may be disposed between the first transparent sheet 621 and a display panel (not shown) including a touch panel to balance a structure of the cover window 620 and to reinforce the rigidity of the cover window 620.

The first cohesive layer 623 may be used for adhesion between the third transparent sheet 626 and the first transparent sheet 621 on which the first coating layer 622 is formed. In this case, the first cohesive layer 623 may be any one of an OCA film, a hot melt cohesive agent, and PDMS having a plasma-processed surface.

The second conhesive layer 627 may be used for adhesion between the third transparent sheet 626 and the second transparent sheet 624 on which the second coating layer 625 is formed. In this case, the second conhesive layer 627 may be any one of an OCA film, a hot melt cohesive agent, and PDMS having a plasma-processed surface.

In this case, the first cohesive layer 623 and the second conhesive layer 627 may use a hot melt adhesive or PDMS having a plasma-processed surface instead of using an OCA film and, accordingly, the cover window 620 with high rigidity and enhanced flexural property and impact resistance may be manufactured.

The second coating layer 625 may be formed on the second transparent sheet 624 to protect the first transparent sheet 621, the first cohesive layer 623, the second transparent sheet 624, the third transparent sheet 626, and the second conhesive layer 627 that are vulnerable to scratch and has degraded chemical resistance. In this case, the second coating layer 625 may be formed of a silica organic-inorganic complex composition. For example, the second coating layer 625 may be mixed with an inorganic binder as a $SiO_2$ particle having a surface reformed with acryl and an organic binder as an acryl binder. In this case, the $SiO_2$ particle may have a size of 20 nm. As such, the second coating layer 625 may be disposed the second transparent sheet 624, thereby overcoming errors in terms of an outer appearance, for example, a display is scratched and squashed.

In this case, the first coating layer 622 and the second coating layer 625 may have a thickness of 10 μm to 80 μm. In detail, the first coating layer 622 and the second coating layer 625 may have a thickness of 10 μm to 50 μm.

The first coating layer 622 and the second coating layer 625 may further include a nano inorganic particle. In this case, the nano inorganic particle may be included by 40 wt % to 60 wt % with respect to the first coating layer 622 and the second coating layer 625. In this case, the nano inorganic particle included in the first coating layer 622 and the second coating layer 625 may be at least one of $Al_2O_3$ and $ZrO_2$. In detail, the nano inorganic particle included in the first coating layer 622 and the second coating layer 625 may be $Al_2O_3$. As such, the first coating layer 622 and the second coating layer 625 further include a nano inorganic particle to enhance hardness and, thus, a cover window that is as thin as possible and is not squashed due to maintained rigidity may be manufactured.

In this case, the cover window 620 according to an exemplary embodiment of the present disclosure may be disposed on a display module (not shown), that is, on an outermost part of a display to protect a display panel and a touch panel. In this case, the cover window 620 may adhere to a display module (not shown) using any one of an OCA film, a hot melt cohesive agent, and PDMS having a plasma-processed surface.

Hereinafter, characteristics of various cover windows are described in detail with reference to Table 2 below.

TABLE 2

Characteristics Comparison of Various Cover Windows

|  |  | Glass | | Plastic | | |
|---|---|---|---|---|---|---|
|  |  | Tempered | | | Laminated plate | |
|  |  | glass | HC coating | OCA | Hot Melt | PDMS |
| Structure |  |  | HC/PC/HC | HC/PET/adhesive/PET/HC | | |
| Thickness (mm) |  | 0.55 | 0.5 | 0.56 | 0.52 | 0.74 |
| Flexural property | Maximum load, kgf | 15 | 0.5 | 0.6 | 1 | 1.8 |
|  | Modulus, GPa | 70 | 3.7 | 1.9 | 5 | 4 |
| Hardness | Pencil, H | >9 | 6 | 9 | 9 | 9 |
| Impact resistance | cm@36 g | — | 30 | 80 | 80 | 80 |
| (Ball drop) | cm@130 g | >20 | 15 | 25 | 50 | 50 |

Table 2 above shows characteristic comparison of tempered glass and plastic cover windows. In detail, Table 2 above shows characteristic comparison of a cover window formed of tempered glass, a cover window manufactured by forming a coating layer on a plastic transparent sheet, and a cover window manufactured by stacking at least one plastic transparent sheet and at least one coating layer and forming adhesion therebetween using any one of an OCA film, a hot melt cohesive agent, and PDMS having a plasma-processed surface.

As seen from Table 2 above, the plastic cover window has a Modulus value equal to or less than about 5 GPa but the tempered glass cover window has a Modulus value of about 70 GPa and is very hard.

However, it may be seen that an impact resistance value of the tempered glass cover window is lower than the plastic cover window manufactured using a hot melt cohesive agent or PDMS having a plasma-processed surface.

In this case, an impact resistance value may be determined according to whether a cover window withstands impact of an iron ball with a predetermined weight when the iron ball is dropped at a predetermined height above the cover window and, in this regard, a height at which the cover window begins to crack due to impact may be defined as an impact resistance value.

It may be seen that an impact resistance value of a cover window manufactured by forming only a coating layer (HC coating) on a plastic transparent sheet is lower than an impact resistance value of a cover window manufactured by stacking at least one plastic transparent sheet and at least one coating layer and forming adhesion therebetween.

It may be seen that an impact resistance value of a cover window manufactured via adhesion between at least one plastic transparent sheet and at least one coating layer using an OCA film (acrylic OCA) is lower than an impact resistance value of a plastic cover window manufactured using a hot melt cohesive agent or PDMS having a plasma-processed surface and flexural property is also enhanced.

In this case, flexural property refers to a degree that withstands bending force when a display is bent and, in this regard, excellent flexural property means that the display is not easily bent.

That is, it may be seen that a cover window manufactured via adhesion between at least one plastic transparent sheet and at least one coating layer, in particular, a plastic cover window manufactured using a hot melt cohesive agent or PDMS having a plasma-processed surface has enhanced flexural property, hardness, and impact resistance compared with a plastic cover window manufactured by forming only one coating layer.

Figure 9:
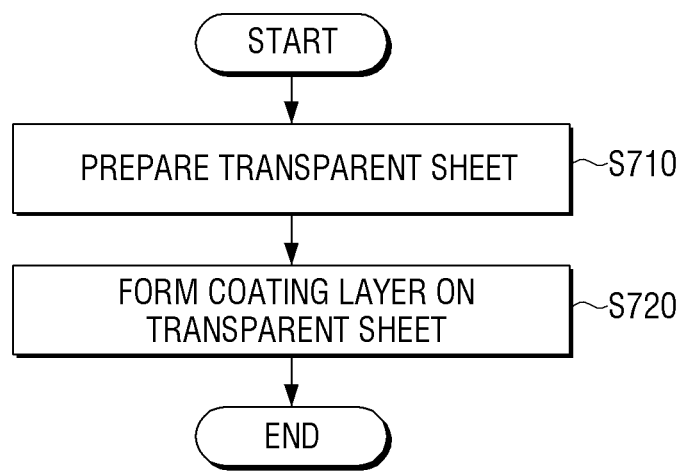

FIG. 9 is a flowchart for explanation of a method of manufacturing a cover window according to an exemplary embodiment of the present disclosure.

Referring to FIG. 9, first, a transparent sheet may be prepared (S710). In this case, the transparent sheet may be at least one film of PET, PEN, PMMA, and CPI. In this case, the transparent sheet may further include a nano inorganic particle with at least one of PET, PEN, PMMA, and CPI as a mother material. In this case, the nano inorganic particle included in the transparent sheet may be at least one of $SiO_2$, $Al_2O_3$, and $ZrO_2$. In this case, the nano inorganic particle may be included in the transparent sheet by adding the nano inorganic particle during a polymerization procedure of at least one film of PET, PEN, PMMA, and CPI.

Then, a coating layer may be formed on the transparent sheet (S720). In this case, the coating layer may be formed of a silica organic-inorganic complex composition and may further include a nano inorganic particle. In this case, the nano inorganic particle may be at least one of $Al_2O_3$ and $ZrO_2$. The coating layer may be formed on the transparent sheet using a roll-to-roll process. A method of forming the coating layer on the transparent sheet is described below in detail with reference to FIG. 10.

A cover window for protecting a display panel manufactured by including a nano inorganic particle in at least one of a transparent sheet and a coating layer may have enhanced hardness, may be as thin as possible, and may not be squashed due to maintained rigidity.

Although not shown, a cover window manufactured using the method according to an exemplary embodiment of the present disclosure may adhere onto a display module using any one of an OCA film, a hot melt cohesive agent, and PDMS having a plasma-processed surface.

Figure 10:
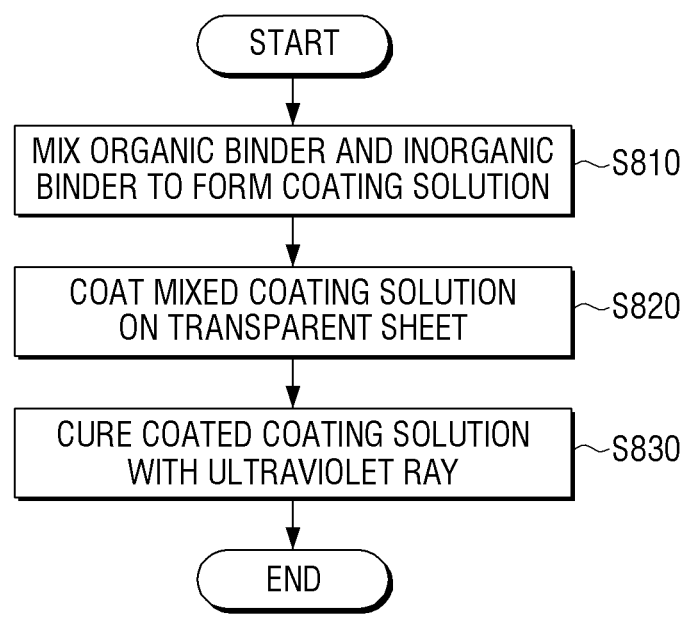
FIG. 10 is a flowchart for explanation of a method of forming a coating layer of a cover window according to an exemplary embodiment of the present disclosure.

FIG. 10 is a flowchart for explanation of a method of forming a coating layer of a cover window according to an exemplary embodiment of the present disclosure.

Referring to FIG. 10, first, an organic binder and an inorganic binder may be mixed to form a coating liquid to form coating solution (S810). In detail, an organic binder, an inorganic binder, an initiator, a solvent, and additives may be mixed using a distribution method to form a coating solution. In this case, a weight ratio of the organic binder and the organic binder may be 1:1.

In this case, the organic binder may be an acryl binder. In detail, the organic binder may be nine-functional aliphatic urethane acrylate. The inorganic binder may be $SiO_2$ with a surface-modified reactive acrylic group. In this case, the inorganic binder may include $Al_2O_3$ with a surface-modified reactive acrylic group. The initiator may function as a catalyst to polymerize an organic binder and an inorganic binder which are a monomer or an oligomer to form a polymer. In detail, the initiator may be polyimide (PI).

Then, the mixed coating solution may be coated on a transparent sheet (S820). In detail, the mixed coating solution may be coated on the transparent sheet using a roll-to-roll method. In this case, the roll-to-roll method may be used to manufacture to a film or a functional film such as glass and may perform high rate deposition on a thin film while maintaining a thickness of a deposited film.

In this case, a coating method may be any one of a dipping method, a spray method, a slot die method, and a gravia method.

In this case, the dipping method is a method of covering a device, a component, or the like with a plastic film and, that is, taking the transparent sheet in and out the coating solution.

The spray method is a method of spraying and coating a coating solution in a mist state onto the transparent sheet using compressed air or squeeze pumping with a spray and may be, for example, an air spray, an airless spray, and electrostatic painting.

The slot die method is a method of supplying a coating solution that is a fluid to a slot die configured between upper and lower mold plates designed and processed by a piston pump or the like according to rheology and coating the transparent sheet with the coating solution supplied to the slot die to a predetermined and uniform thickness in a width direction of a proceeding direction.

The gravia method is a coating method appropriate for a low viscosity coating solution, that is, a method of rotating a roll having a thin groove on a surface thereof while being partially dipped in a tank with a coating solution therein, adjusting an amount of a coating solution on the roll surface by a doctor blade and, then, pressing the roll on the transparent sheet to transfer the coating solution.

Although not shown, as a next procedure, the method may further include an operation of drying the transparent sheet with the coating solution coated thereon to remove a solvent of the coating solution.

Then, the coating solution coated on the transparent sheet may be cured with ultraviolet rays (S830). In this case, ultraviolet ray curing may enable the coating solution including a monomer or an oligomer to be instantly polymerized with ultraviolet rays with high energy to form a polymer.

Accordingly, a coating layer with high hardness may be formed on the plastic transparent sheet without high temperature processing, thereby overcoming errors in terms of an outer appearance, for example, a display is scratched and squashed.

Figure 11:
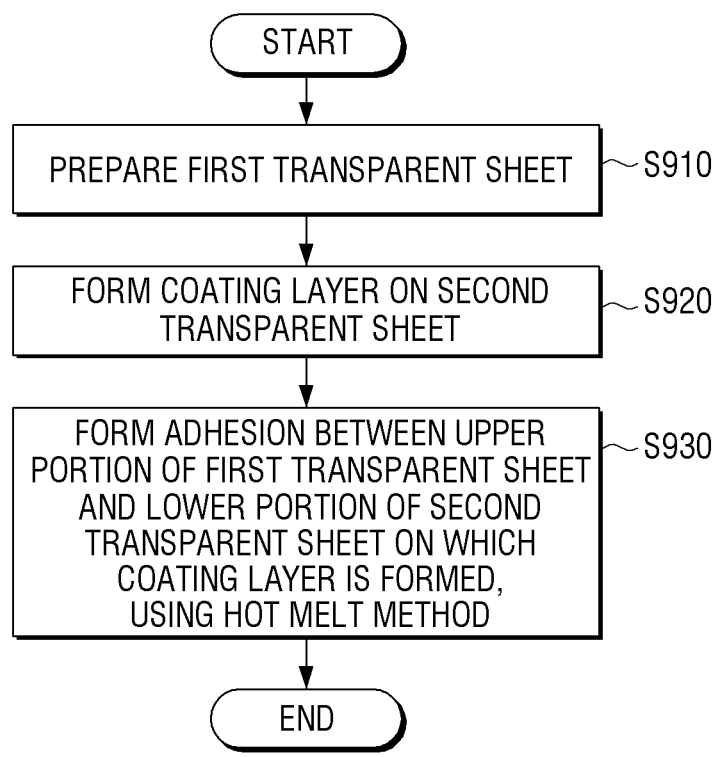

FIG. 11 is a flowchart for explanation of a method of manufacturing a cover window using a hot melt cohesive agent according to an exemplary embodiment of the present disclosure.

Referring to FIG. 11, first, a first transparent sheet (hereinafter, referred to as a lower transparent sheet) may be prepared (S910). Then, a coating layer may be formed on a second transparent sheet (hereinafter, referred to as an upper transparent sheet) (S920). In this case, the lower transparent sheet and the upper transparent sheet may be at least one film of PET, PEN, PMMA, and CPI. In this case, the lower transparent sheet and the upper transparent sheet may further include a nano inorganic particle with at least one of PET, PEN, PMMA, and CPI as a mother material. In this case, the nano inorganic particle included in the lower transparent sheet and the upper transparent sheet may be at least one of $SiO_2$, $Al_2O_3$, and $ZrO_2$. In this case, the nano inorganic particle may be included in the transparent sheet by adding the nano inorganic particle during a polymerization procedure of at least one film of PET, PEN, PMMA, and CPI.

The coating layer may be formed of a silica organic-inorganic complex composition and may further include a nano inorganic particle. In this case, the nano inorganic particle may be at least one of $Al_2O_3$ and $ZrO_2$. A method of forming a coating layer is the same as in the description given with reference to FIG. 10 and, thus, a description thereof is omitted here.

Then, an upper portion of the lower transparent sheet and a lower portion of the upper transparent sheet on which the coating layer is formed may adhere to each other using a hot melt method (S930).

As such, a cover window for protecting a display panel manufactured by including a nano inorganic particle in at least one of a transparent sheet and a coating layer may have enhanced hardness, may be as thin as possible, and may not be squashed due to maintained rigidity.

A cover window manufactured via adhesion between at least one plastic transparent sheet and at least one coating layer using a hot melt cohesive agent may have enhanced flexural property, hardness, and impact resistance compared with a plastic cover window manufactured by forming only one coating layer.

Although not shown, a cover window manufactured using the method according to an exemplary embodiment of the present disclosure may adhere onto a display module using any one of an OCA film, a hot melt cohesive agent, and PDMS having a plasma-processed surface.

Figure 12:
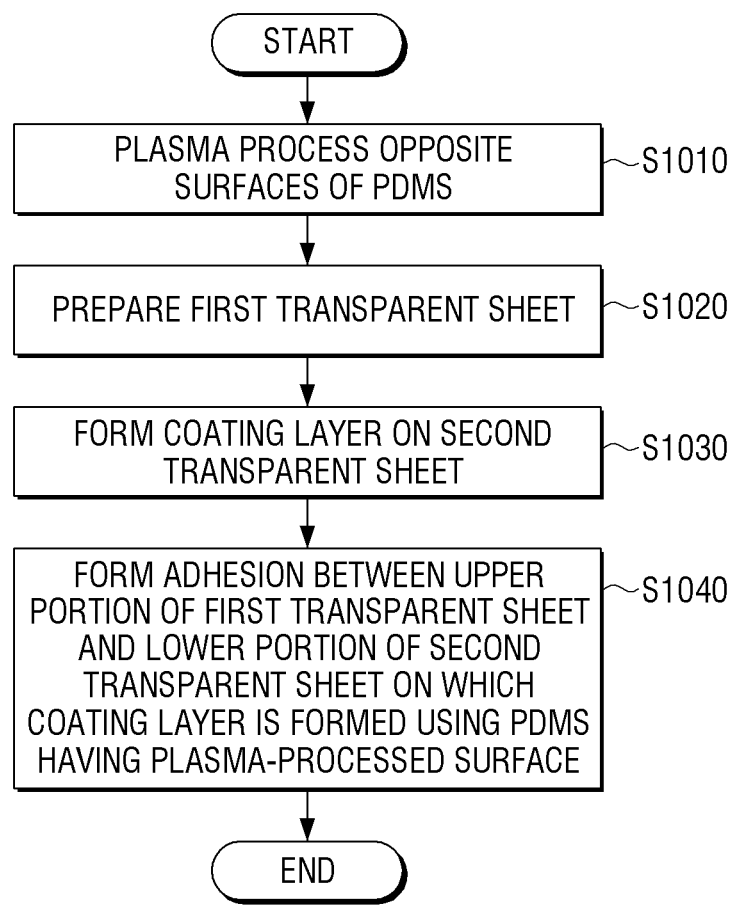

FIG. 12 is a flowchart for explanation of a method of manufacturing a cover window using PDMS having a plasma-processed surface according to an exemplary embodiment of the present disclosure.

Referring to FIG. 12, first, opposite surfaces of a PDMS film may be plasma processed (S1010). In detail, after the surface of PDMS is $O_2$-plasma processed and a surface of the transparent sheet is $N_2$-plasma processed, the PDMS and the transparent sheet may be used.

Then, the first transparent sheet (hereinafter, referred to as a lower transparent sheet) may be prepared (S1020). Then, a coating layer may be formed on a second transparent sheet (hereinafter, referred to as an upper transparent sheet) (S1030). In this ca se, the lower transparent sheet and the upper transparent sheet may be at least one film of PET, PEN, PMMA, and CPI. In this case, the lower transparent sheet and the upper transparent sheet may further include a nano inorganic particle with at least one of PET, PEN, PMMA, and CPI as a mother material. In this case, the nano inorganic particle included in the lower transparent sheet and the upper transparent sheet may be at least one of $SiO_2$, $Al_2O_3$, and $ZrO_2$. In this case, the nano inorganic particle may be included in the transparent sheet by adding the nano inorganic particle during a polymerization procedure of at least one film of PET, PEN, PMMA, and CPI.

The coating layer may be formed of a silica organic-inorganic complex composition and may further include a nano inorganic particle. In this case, the nano inorganic particle may be at least one of $Al_2O_3$ and $ZrO_2$. A method of forming a coating layer is the same as in the description given with reference to FIG. 10 and, thus, a description thereof is omitted here.

Then, an upper portion of the lower transparent sheet and a lower portion of the upper transparent sheet on which the coating layer is formed may adhere to each other using PDMS having a plasma-processed surface (S1040).

As such, a cover window for protecting a display panel manufactured by including a nano inorganic particle in at least one of a transparent sheet and a coating layer may have enhanced hardness, may be as thin as possible, and may not be squashed due to maintained rigidity.

A cover window manufactured via adhesion between at least one plastic transparent sheet and at least one coating layer using PDMS having a plasma-processed surface may have enhanced flexural property, hardness, and impact resistance compared with a plastic cover window manufactured by forming only one coating layer.

Although not shown, a cover window manufactured using the method according to an exemplary embodiment of the present disclosure may adhere onto a display module using any one of an OCA film, a hot melt cohesive agent, and PDMS having a plasma-processed surface.

Figure 13:
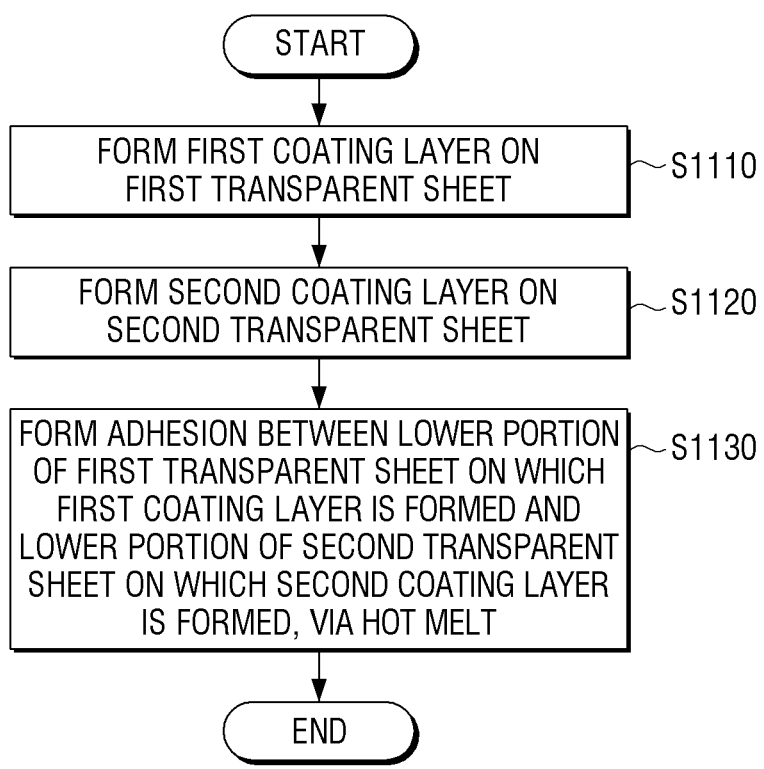

FIG. 13 is a flowchart for explanation of a method of manufacturing a cover window stacked to balance a structure according to an exemplary embodiment of the present disclosure.

Referring to FIG. 13, first, a first coating layer (hereinafter, referred to as a coating layer) may be formed on a first transparent sheet (hereinafter, referred to as a lower transparent sheet) (S1110). Then, a second coating layer (hereinafter, referred to as an upper coating layer) may be formed on a second transparent sheet (hereinafter, referred to as an upper transparent sheet) (S1120). In this case, the lower transparent sheet and the upper transparent sheet may be at least one film of PET, PEN, PMMA, and CPI. In this case, the lower transparent sheet and the upper transparent sheet may further include a nano inorganic particle with at least one of PET, PEN, PMMA, and CPI as a mother material. In this case, the nano inorganic particle included in the lower transparent sheet and the upper transparent sheet may be at least one of $SiO_2$, $Al_2O_3$, and $ZrO_2$. In this case, the nano inorganic particle may be included in the transparent sheet by adding the nano inorganic particle during a polymerization procedure of at least one film of PET, PEN, PMMA, and CPI.

The lower coating layer and the upper coating layer may be formed of a silica organic-inorganic complex composition and may further include a nano inorganic particle. In this case, the nano inorganic particle may be at least one of $Al_2O_3$ and $ZrO_2$. A method of forming the lower coating layer and the upper coating layer is the same as in the description given with reference to FIG. 8 and, thus, a description thereof is omitted here.

For convenience of description, although the case in which the lower coating layer is formed on the lower transparent sheet and, then, the upper coating layer is formed on the upper transparent sheet is described, an order of forming the upper and lower coating layers may be changed or the upper and lower coating layers may be simultaneously formed in reality.

Then, a lower portion of the lower transparent sheet on which the lower coating layer is formed and an upper portion of the upper transparent sheet on which the upper coating layer is formed may adhere to each other using a hot melt method (S1130). For convenience of description, the case in which a lower portion of the lower transparent sheet on which the lower coating layer is formed and an upper portion of the upper transparent sheet on which the upper coating layer is formed adhere to each other using a hot melt method is illustrated and described, they may adhere to each other using PDMS having a plasma-processed surface in reality.

As such, a cover window for protecting a display panel manufactured by including a nano inorganic particle in at least one of a transparent sheet and a coating layer may have enhanced hardness, may be as thin as possible, and may not be squashed due to maintained rigidity.

A cover window manufactured via adhesion between at least one plastic transparent sheet and at least one coating layer using any one of a hot melt cohesive agent and PDMS having a plasma-processed surface may have enhanced flexural property, hardness, and impact resistance compared with a plastic cover window manufactured by forming only one coating layer.

Although not shown, a cover window manufactured using the method according to an exemplary embodiment of the present disclosure may adhere onto a display module using any one of an OCA film, a hot melt cohesive agent, and PDMS having a plasma-processed surface.

FIG. 14 is a flowchart for explanation of a method of manufacturing a cover window including a core layer according to an exemplary embodiment of the present disclosure.

Referring to FIG. 14, first, a first coating layer may be formed on a first transparent sheet (S1210). Then, a second coating layer may be formed on a second transparent sheet (S1220). In this case, the first transparent sheet and the second transparent sheet may be at least one of PET, PEN, PMMA, and CPI. In this case, the first transparent sheet and the second transparent sheet may further include a nano inorganic particle with at least one of PET, PEN, PMMA, and CPI as a mother material. In this case, the nano inorganic particle included in the first transparent sheet and the second transparent sheet may be at least one of $SiO_2$, $Al_2O_3$, and $ZrO_2$. In this case, the nano inorganic particle may be included in the transparent sheet by adding the nano inorganic particle during a polymerization procedure of at least one film of PET, PEN, PMMA, and CPI.

The first coating layer and the second coating layer may be formed of a silica organic-inorganic complex composition and may further include a nano inorganic particle. In this case, the nano inorganic particle may be at least one of $Al_2O_3$ and $ZrO_2$. A method of forming the first coating layer and the second coating layer is the same as in the description given with reference to FIG. 8 and, thus, a description thereof is omitted here.

For convenience of description, although the case in which the first coating layer is formed on the first transparent sheet and, then, the second coating layer is formed on the second transparent sheet is described, an order of forming the first coating layer and the second coating layer may be changed or they may be simultaneously formed in reality.

Then, a lower portion of the first transparent sheet on which the first coating layer is formed may adhere to one surface of a third transparent sheet using a hot melt method (S1230). Then, a lower portion of the second transparent sheet in which the second coating layer is formed may adhere to the other surface of the third transparent sheet using a hot melt method (S1240). For convenience of description, although the case in which the third transparent sheet and the first transparent sheet adhere to each other and, then, the second transparent sheet adhere to the opposite surface of the third transparent sheet is described, an adhesion order may be changed or they may be simultaneously formed.

For convenience of description, although the limited case in which adhesion between one surface of the third transparent sheet and a lower portion of the first transparent sheet on which the first coating layer is formed and adhesion between the other surface of the third transparent sheet and a lower portion of the second transparent sheet on which the second coating layer is formed are achieved using a hot melt method is described, adhesion may be performed using PDMS having a plasma-processed surface in reality.

As such, a cover window for protecting a display panel manufactured by including a nano inorganic particle in at least one of a transparent sheet and a coating layer may have enhanced hardness, may be as thin as possible, and may not be squashed due to maintained rigidity.

A cover window manufactured via adhesion between at least one plastic transparent sheet and at least one coating layer using any one of a hot melt cohesive agent and PDMS having a plasma-processed surface may have enhanced flexural property, hardness, and impact resistance compared with a plastic cover window manufactured by forming only one coating layer.

Although not shown, a cover window manufactured using the method according to an exemplary embodiment of the present disclosure may adhere onto a display module using any one of an OCA film, a hot melt cohesive agent, and PDMS having a plasma-processed surface.

A cover window for protecting a display panel manufactured the above method may be easily without being squashed and may have simultaneously enhanced flexural property and impact resistance.

The foregoing exemplary embodiments and advantages are merely exemplary and are not to be construed as limiting the present disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A flexible display panel cover window, comprising:
a transparent sheet having transmittance with respect to light from the display panel, the transparent sheet comprising a nano inorganic particle, the transparent sheet having a thickness of 50 μm to 190 μm; and
a coating layer disposed on the transparent sheet, wherein
the nano inorganic particle is incorporated into the transparent sheet by 10 wt % to 40 wt % with respect to the transparent sheet, and
a base material of the transparent sheet comprises at least one of polyethylene terephthalate (PET), polyethylene naphthalate (PEN), polymethylmethacrylate (PMMA), or colorless polyimide (CPI).

2. The cover window of claim 1, wherein the nano inorganic particle comprises at least one of $SiO_2$, $Al_2O_3$, or $ZrO_2$.

3. The cover window of claim 1, wherein the transparent sheet and the coating layer adhere to each other using hot melt or polydimethylsiloxane (PDMS).

4. A flexible display panel cover window, comprising:
a transparent sheet having transmittance with respect to light from the display panel, the transparent sheet comprising a first nano inorganic particle incorporated into the transparent sheet, the transparent sheet having a thickness of 50 μm to 190 μm; and
a coating layer disposed on the transparent sheet and comprising a second nano inorganic particle, wherein
the first nano inorganic particle is included in the transparent sheet by 10 wt % to 40 wt % with respect to the transparent sheet, and
a base material of the transparent sheet comprises at least one of polyethylene terephthalate (PET), polyethylene naphthalate (PEN), polymethylmethacrylate (PMMA), or colorless polyimide (CPI).

5. The cover window of claim 4, wherein the second nano inorganic particle comprises at least one of $Al_2O_3$ or $ZrO_2$.

6. The cover window of claim 4, wherein the coating layer has a thickness of 10 μm to 80 μm.

7. The cover window of claim 4, wherein the second nano inorganic particle is included in the coating layer by 40 wt % to 60 wt % with respect to the transparent sheet.

8. The cover window of claim 4, wherein the transparent sheet and the coating layer adhere to each other using hot melt or PDMS.

9. A flexible display panel cover window, comprising:
a lower transparent sheet having transmittance with respect to light from the display panel, the lower transparent sheet comprising a nano inorganic particle incorporated into the lower transparent sheet;
a hot melt cohesive layer disposed on the lower transparent sheet;
an upper transparent sheet disposed on the hot melt cohesive layer, the upper transparent sheet comprising the nano inorganic particle incorporated into the upper transparent sheet; and
an upper coating layer disposed on the upper transparent sheet, wherein
the lower transparent sheet and the upper transparent sheet each have a thickness of 50 μm to 190 μm, wherein
the nano inorganic particle is included in the lower transparent sheet and the upper transparent sheet by 10 wt % to 40 wt % with respect to the lower transparent sheet and the upper transparent sheet respectively,
a base material of the lower transparent sheet comprises at least one of polyethylene terephthalate (PET), polyethylene naphthalate (PEN), polymethylmethacrylate (PMMA), or colorless polyimide (CPI), and
a base material of the upper transparent sheet comprises at least one of polyethylene terephthalate (PET), polyethylene naphthalate (PEN), polymethylmethacrylate (PMMA), or colorless polyimide (CPI).

10. The cover window of claim 9, further comprising a lower coating layer disposed between the display panel and the lower transparent sheet.

11. A flexible display panel cover window, comprising:
a first transparent sheet having transmittance with respect to light from the display panel, the first transparent sheet comprising a nano inorganic particle incorporated into the first transparent sheet;
a first polydimethylsiloxane (PDMS) cohesive layer disposed on the first transparent sheet and having a plasma-processed surface;
a second transparent sheet disposed on the PDMS cohesive layer having a plasma-processed surface; and
a coating layer disposed on the second transparent sheet, wherein
the first transparent sheet and the second transparent sheet each have a thickness of 50 μm to 190 μm,
the nano inorganic particle is included in the first transparent sheet and the second transparent sheet by 10 wt % to 40 wt % with respect to the first transparent sheet and the second transparent sheet respectively, a base material of the first transparent sheet comprises at least one of polyethylene terephthalate (PET), polyethylene naphthalate (PEN), polymethylmethacrylate (PMMA), or colorless polyimide (CPI), and a base material of the second transparent sheet comprises at least one of polyethylene terephthalate (PET), polyethylene naphthalate (PEN), polymethylmethacrylate (PMMA), or colorless polyimide (CPI).

12. The cover window of claim 11, further comprising:

a third transparent sheet disposed on the PDMS cohesive layer having a plasma-processed surface; and a second PDMS cohesive layer disposed on the third transparent sheet and having a plasma-processed surface.

* * * * *